(12) United States Patent
Sakaguchi et al.

(10) Patent No.: US 7,682,749 B2
(45) Date of Patent: *Mar. 23, 2010

(54) NON-AQUEOUS ELECTROLYTE SECONDARY BATTERY

(75) Inventors: Shin-ichiro Sakaguchi, Moriguchi (JP); Yoshitaka Minamida, Moriguchi (JP); Satoru Naruse, Moriguchi (JP)

(73) Assignee: SANYO Electric Co., Ltd., Osaka (JP)

( * ) Notice: Subject to any disclaimer, the term of this patent is extended or adjusted under 35 U.S.C. 154(b) by 38 days.

This patent is subject to a terminal disclaimer.

(21) Appl. No.: 12/004,019

(22) Filed: Dec. 20, 2007

(65) Prior Publication Data

US 2008/0187836 A1 Aug. 7, 2008

(30) Foreign Application Priority Data

Dec. 25, 2006 (JP) .............................. 2006-347333

(51) Int. Cl.
*H01M 4/58* (2010.01)
(52) U.S. Cl. .............. 429/231.3; 429/231.1; 429/231.5; 429/232; 429/338; 429/330
(58) Field of Classification Search ............... 429/231.5, 429/231.1, 231.3, 232, 338, 330
See application file for complete search history.

(56) References Cited

U.S. PATENT DOCUMENTS

| | | | | |
|---|---|---|---|---|
| 6,489,062 | B1 * | 12/2002 | Watanabe et al. | ........ 429/231.5 |
| 7,150,840 | B2 | 12/2006 | Yamamoto et al. | .......... 252/500 |
| 2005/0221170 | A1 * | 10/2005 | Takeuchi et al. | ............ 429/122 |
| 2006/0216607 | A1 * | 9/2006 | Takeuchi et al. | ............ 429/232 |
| 2007/0196735 | A1 | 8/2007 | Takeuchi et al. | ......... 429/231.1 |

FOREIGN PATENT DOCUMENTS

JP    2000-243445 A    9/2000

* cited by examiner

*Primary Examiner*—Laura S Weiner
(74) *Attorney, Agent, or Firm*—Kubovcik & Kubovcik

(57) ABSTRACT

A non-aqueous electrolyte secondary battery uses, as its positive electrode or negative electrode, an electrode containing an active material and a conductive agent, the active material being made of a mixture of a molybdenum dioxide and a lithium titanium oxide in a weight ratio (molybdenum dioxide: lithium titanium oxide) of from 90:10 to 50:50, and the conductive agent containing graphitized vapor grown carbon fiber and massive graphite. The massive graphite has an average particle size of 10 μm or greater.

4 Claims, 2 Drawing Sheets

NON-AQUEOUS ELECTROLYTE SECONDARY BATTERY

FIELD OF THE INVENTION

The present invention relates to non-aqueous electrolyte secondary batteries, and more particularly to a non-aqueous electrolyte secondary battery that may be used as a power source for memory backup in mobile devices.

Description of Related Art

In recent years, a high electromotive force non-aqueous electrolyte secondary battery using a non-aqueous electrolyte has been widely used as a secondary battery that achieves high power and high energy density. This type of non-aqueous electrolyte secondary battery has been used as a power source for backing up memory data in mobile devices, in addition to the use as a main power source of the mobile devices. As the energy density of the main power source of the mobile devices tends to increase, higher energy density has been required correspondingly for the power source for memory backup.

A battery that employs, for example, lithium cobalt oxide ($LiCoO_2$) as the positive electrode active material and a lithium titanium oxide that has a spinel structure ($Li_4Ti_5O_{12}$) as the negative electrode active material has already been introduced into the market as a secondary battery for memory backup. However, the density and capacity per weight of the lithium titanium oxide used as the negative electrode active material are 3.47 g/mL and 175 mAh/g, respectively, and, therefore, it. has the problem of low energy density per volume. In contrast, molybdeunum dioxide, which reversibly reacts with lithium at the same or similar potential region as the lithium titanium oxide, shows a density of 6.44 g/mL and a capacity per weight of 210 mAh/g, so it has a higher volumetric energy density than the lithium titanium oxide. Therefore, it becomes possible to increase the battery energy density per volume by using a molybdenum dioxide in place of the lithium titanium oxide.

For example, Japanese Published unexamined Patent Application No. 2000-243445 proposes a non-aqueous electrolyte secondary battery that uses a lithium-containing manganese oxide as the positive electrode active material and a molybdenum dioxide as the negative electrode.

However, when molybdenum dioxide is used as the negative electrode active material, a problem arises that it expands and shrinks greatly when intercalating and deintercalating lithium and is unable to provide sufficient cycle performance.

In view of the above, it has been found that a non-aqueous electrolyte secondary battery that shows excellent volumetric energy density and cycle performance can be obtained as a result of using an active material in which a molybdenum dioxide and a lithium titanium oxide are mixed together. (See, for example, U.S. Patent Application Publication 2007/0196735 A1.) Employing such a configuration makes it possible to increase the energy density while keeping the voltage compatibility with the conventional battery that uses a lithium titanium oxide because molybdenum dioxide can achieve a higher volumetric energy density of the electrode than lithium titanium oxide, and moreover may improve the cycle performance, which has been the problem with the use of molybdenum dioxide.

Nevertheless, it is observed that, even with the use of the mixture of molybdenum dioxide and lithium titanium oxide, the cycle performance degrades when the current value during charge and discharge is high.

It is an object of the present invention to provide a non-aqueous electrolyte secondary battery that exhibits excellent cycle performance even when the current value during charge and discharge is high as described above.

SUMMARY OF THE INVENTION

The present invention provides a non-aqueous electrolyte secondary battery comprising: a positive electrode; a negative electrode; and a non-aqueous electrolyte, the positive electrode or the negative electrode being an electrode containing an active material and a conductive agent, the active material being made of a mixture of a molybdenum dioxide and a lithium titanium oxide in a weight ratio (molybdenum dioxide : lithium titanium oxide) of from 90:10 to 50:50, and the conductive agent containing graphitized vapor grown carbon fiber and massive graphite having an average particle size of 10 µm or greater.

The present invention provides a non-aqueous electrolyte secondary battery with high battery capacity and good cycle performance.

DETAILED DESCRIPTION OF THE INVENTION

Figure 1:
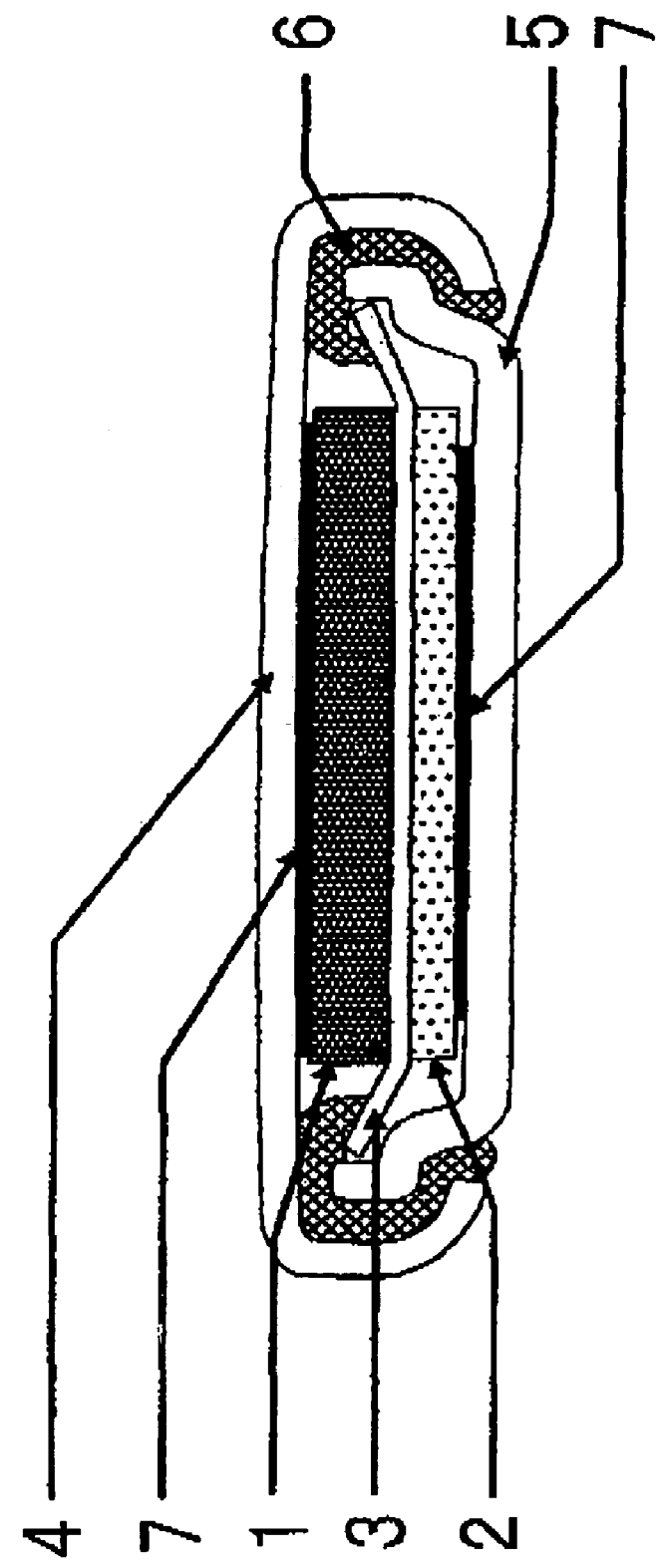
FIG. 1 is a schematic cross-sectional view illustrating a lithium secondary battery prepared according to one example of the present invention.

A non-aqueous electrolyte secondary battery according to the present invention comprises: a positive electrode; a negative electrode; and a non-aqueous electrolyte. The positive electrode, or the negative electrode is an electrode containing an active material and a conductive agent. The active material is made of a mixture of a molybdenum dioxide and a lithium titanium oxide in a weight ratio (molybdenum dioxide: lithium titanium oxide) of from 90:10 to 50:50. The conductive agent containing graphitized vapor grown carbon fiber and massive graphite. The massive graphite has an average particle size of 10 µm or greater.

Both the graphitized vapor grown carbon fiber and the massive graphite (sometimes referred to in the art as vein or lump graphite) are conductivity agents that are used for the purposes of enhancing electrode conductivity to improve the utilization factor of the active material and the cycle performance. Of the two substances, the graphitized vapor grown carbon fiber improves the electrode conductivity more effectively. However, when the graphitized vapor grown carbon fiber is used alone, the formability and strength of the active material mixture are insufficient. Therefore, it is preferable to use the graphitized vapor grown carbon fiber together with the massive graphite.

For this reason, U.S. Patent Application Publication 2007/0196735 A1 also describes that a lithium secondary battery may be fabricated using graphitized vapor grown carbon fiber and massive graphite and, as a result of performance evaluation, it. shows good cycle performance.

However, it was found that when a cycle performance test is conducted with the battery described in U.S. Patent Application Publication 2007/0196735 A1 at a higher charge-discharge current, sufficient performance cannot be obtained.

In view of this, various studies were conducted for improving the cycle performance further, and as a result, it was found that sufficient cycle performance can be obtained by setting the average particle size of the massive graphite added as a conductive agent into the mixture at 10 µm or greater even when the charge-discharge current is high.

In the present invention, molybdenum dioxide and lithium titanium oxide are mixed in a weight ratio (molybdenum dioxide:lithium titanium oxide) of from 90:10 to 50:50. If the amount of lithium titanium oxide is less than 10 weight %, sufficient cycle performance cannot be obtained. If the amount thereof is greater than 50 weight %, almost no further improvement effect of the cycle performance can be obtained, and moreover, the energy density will be lowered because of the increase in the amount of lithium titanium oxide. It is more preferable that the weight ratio of molybdenum dioxide to lithium titanium oxide be within the range of from 90:10 to 70:30, and still more preferably within the range of from 80:20 to 70:30.

It is desirable that the molybdenum dioxide comprises one having the stoichiometric composition $MoO_2$ as its main component. If a molybdenum dioxide with a high oxidation number, such as $MoO_{2.25}$, is mixed in, contaminated, there is a risk that the initial efficiency and the cycle performance may degrade. In addition, it is preferable that the lithium titanium oxide have the stoichiometric composition $Li_4Ti_5O_{12}$.

In addition, it is preferable that the graphitized vapor grown carbon fiber have a lattice constant $C_0$ within the range 6.7 Å $\leq C_0 \leq$ 6.8 Å and is such that the ratio $L_a/L_c$ of the crystallite dimensions ($L_a$ and $L_c$) in a basal surface (surface a) and in a lamination direction (surface c) is within the range $4 \leq L_a/L_c \leq 6$. Using such a graphitized vapor grown carbon fiber as a conductive agent makes it possible to minimize the decomposition of the electrolyte solution on the conductive agent, providing a non-aqueous electrolyte secondary battery that shows excellent cycle performance and excellent storage performance. The graphitized vapor grown carbon fiber can be produced by a process as described in U.S. Pat. No. 7,150,840, which is incorporated herein by reference.

The massive graphite may be massive artificial graphite. It is especially preferable to use massive artificial graphite having a lattice constant $C_0$ within the range 6.7 Å $\leq C_0 \leq$ 6.8 Å. Using such a massive artificial graphite provides an electrode that has high strength, excellent productivity, and a high utilization factor of the active material. It is preferable that the mix ratio of the graphitized vapor grown carbon fiber and the massive graphite be within the range of from 30:70 to 60:40 in weight ratio (graphitized vapor grown carbon fiber:massive graphite). Moreover, it is preferable that the mix ratio of the entire conductive agent into the electrode mixture be from 3 weight % to 10 weight %.

In the present invention, when a mixture of the molybdenum dioxide and the lithium titanium oxide is used as the positive electrode active material, the negative electrode active material may be, for example, a carbon material such as graphite, and a metal that alloys with lithium, such as aluminum and silicon. By using those materials as the negative electrode active materials, a non-aqueous electrolyte secondary battery that shows a working voltage of about 2.0 V to 1.0 V is provided.

On the other hand, when a mixture of the molybdenums dioxide and the lithium titanium oxide is used as the negative electrode active material in the present invention, the positive electrode active material may be a lithium-containing transition metal composite oxide such as lithium cobalt oxide, which has been used as the positive electrode active material in a non-aqueous electrolyte secondary battery.

When the positive electrode active material is lithium cobalt oxide and the negative electrode active material is the above-described mixture, it is desirable that the negative electrode capacity be lower than the positive electrode capacity, in order to ensure sufficient cycle performance. The reason is as follows. When lithium cobalt oxide is overcharged and the potential rises, the crystal structure of the lithium cobalt oxide is destroyed and the cycle performance degrades. However, when the negative electrode capacity is so low, as compared to the positive electrode capacity, that the battery capacity depends on the negative electrode capacity, the lithium cobalt oxide of the positive electrode is prevented from being overcharged and even better cycle performance can be obtained.

In the present invention, it is preferable that the solvent of the non-aqueous electrolyte contain ethylene carbonate at 5 volume % to 30 volume % in the solvent. If the amount of ethylene carbonate is less than 5 volume %, the lithium ion conductivity in the non-aqueous electrolyte may be insufficient. On the other hand, if the amount of ethylene carbonate is greater than 30 volume %, the surface film originating from the decomposition product of the ethylene carbonate may be formed excessively relative to the negative electrode active material, degrading the cycle performance. Examples of other solvents that may be contained in the non-aqueous electrolyte include cyclic carbonate-based solvents such as propylene carbonate and butylene carbonate, and chain carbonate-based solvents such as diethyl carbonate, ethyl methyl carbonate, and dimethyl carbonate. Preferably, it is desirable to use a mixed solvent of a cyclic carbonate-based solvent and a chain carbonate-based solvent.

Examples of the solute of non-aqueous electrolyte in the present invention include lithium hexafluorophosphate ($LiPF_6$), lithium fluoroborate ($LiBF_4$), LiTFSI ($LiN(CF_3SO_2)_2$), and LiBETI ($LiN(C_2F_5SO_2)_2$)

EXAMPLES

Example 1

Preparation of Positive Electrode $LiCoO_2$, acetylene black, artificial graphite, and polyvinylidene fluoride (PVdF) were mixed in a weight ratio of 89:5:5:1 in N-methyl pyrrolidone (NMP) solvent, then dried, and thereafter pulverized to obtain a positive electrode mixture.

26.5 mg of the positive electrode mixture thus obtained was weighed, then placed in a mold having a diameter of 4.16 mm, and pressure-formed at 600 kg·f, to prepare a disk-shaped positive electrode.

Preparation off Negative Electrode $MoO_2$ and $Li_4Ti_5O_{12}$, which serve as the active material, were mixed at a weight ratio of 75:25. Thereafter, this active material, graphitized vapor grown carbon fiber ($C_0$=6.80 Å, $L_a$=900 Å, $L_c$=200 Å) and massive artificial graphite ($C_0$=6.72 Å, $L_a$=300 Å, $L_c$=300 Å) having an average particle size of 20 μm, and polyvinylidene fluoride (PVdF) as a binder were mixed at a weight ratio of 90:3:4:3, then dried, and thereafter pulverized, to obtain a negative electrode mixture.

15.2 mg of the negative electrode mixture thus obtained was weighed, then placed in a mold having a diameter of 4.16 mm, and pressure-formed at 600 kg·f, to prepare a disk-shaped negative electrode.

Preparation of Electrolyte Solution

Lithium hexafluorophosphate ($LiPF_6$) was dissolved at a concentration of 1 mole/liter in a mixed solvent of 3:7 volume ratio of ethylene carbonate and diethyl carbonate, to thus prepare an electrolyte solution.

Construction of Battery

Using the positive electrode, the negative electrode, and the non-aqueous electrolyte solution as described above, a flat-shaped lithium secondary battery (battery dimensions: diameter 6 mm and thickness 1.4 mm; nominal capacity: 2.5 mAh) was fabricated. FIG. 1 is a schematic cross-sectional view illustrating the lithium secondary battery thus fabricated. As illustrated in FIG. 1, the positive electrode 1 and the negative electrode 2 are placed so as to oppose each other with a separator 3 interposed therebetween, and these components are accommodated in a battery case comprising a positive electrode can 4 and a negative electrode can 5. The positive electrode 1 and the negative electrode 2 are connected to the positive electrode can 4 and the negative electrode can 5, respectively, through a conductivity paste 7 made of carbon. The outer periphery of the negative electrode can 5 is fitted into the positive electrode can 4 with a gasket 6 placed therebetween. As the separator 3, a nonwoven fabric made of polypropylene is used, and the above-described non-aqueous electrolyte is impregnated into the positive electrode 1, the negative electrode 2, and the separator 3.

Example 2

A lithium secondary battery was fabricated in the same manner as described in Example 1, except that the average particle size of the massive artificial graphite used was 15 μm.

Example 3

A lithium secondary battery was fabricated in the same manner as described in Example 1, except that the average particle size of the massive artificial graphite used was 10 μm.

Comparative Example

A lithium secondary battery was fabricated in the same manner as described in Example 1, except that the average particle size of the massive artificial graphite used was 4 μm.

Evaluation of Charge-Discharge Characteristics

The batteries made according to the foregoing examples and comparative example were evaluated in terms of initial charge-discharge characteristics and charge-discharge cycle performance. The measurement conditions are as follows.
<Cycle Performance Measurement Conditions>
Charging: Constant current charge at 200 μA, Cut-off at 3.2 V
Discharging: Constant current discharge at 200 μA, Cut-off at 0.01 V
Rest: 10 seconds The cycle profiles of the batteries of the Examples and the Comparative Example measured according to the just-described conditions are shown in FIG. 2.

Figure 2:
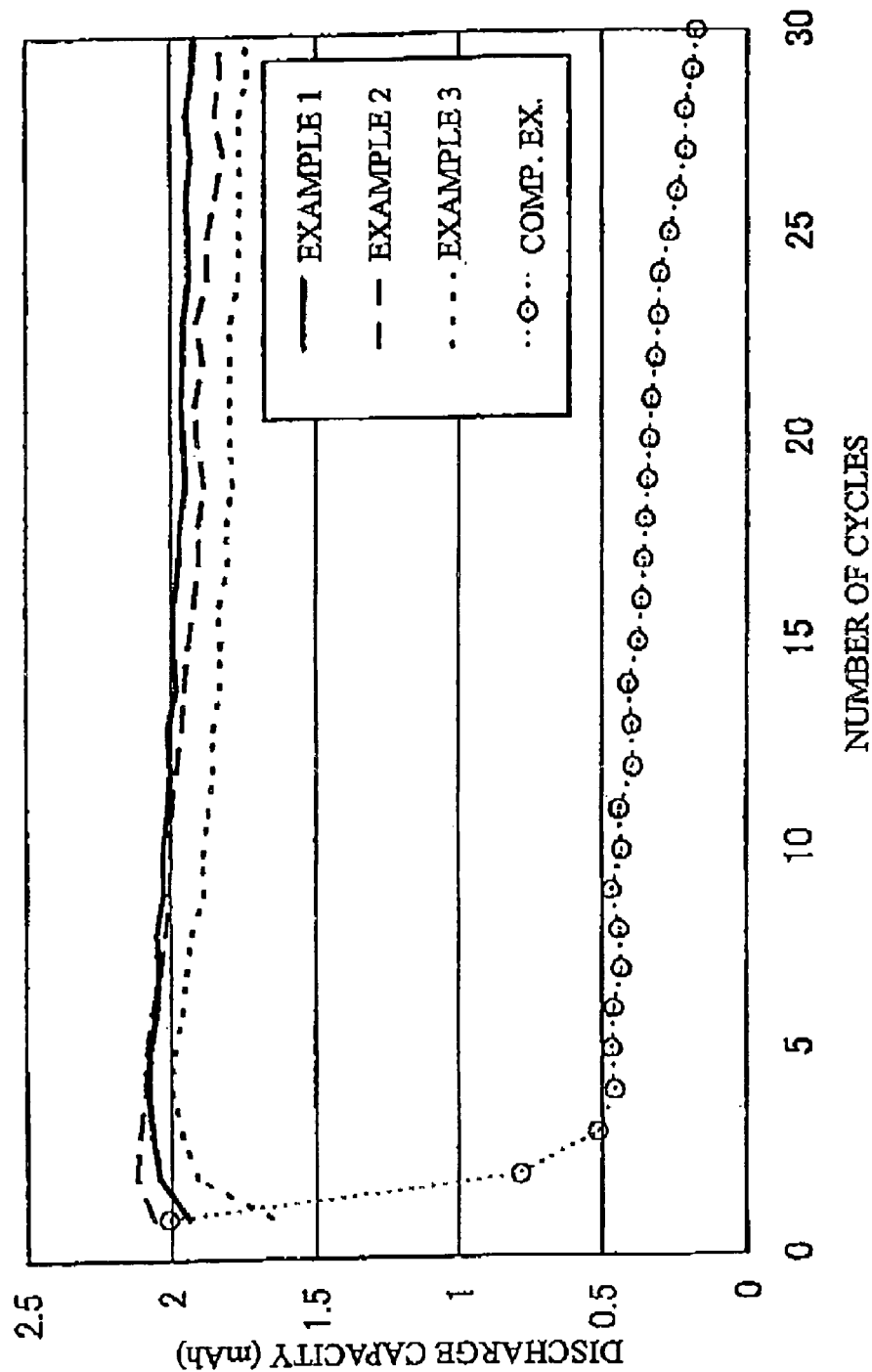
FIG. 2 is a graph illustrating the relationship between average particle diameter of massive graphite and battery cycle performance.

The results shown in FIG. 2 clearly show that the Comparative Example, which used a massive graphite having an average particle size of 4 μm, showed a considerable capacity deterioration over the number of cycles. In contrast, the batteries of Examples 1 to 3, which used a massive graphite having an average particle size of 10 μm or greater, exhibited almost no capacity deterioration with respect to the initial discharge capacity even after 30 cycles, demonstrating that the batteries of Examples 1 to 3 have superior cycle performance.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and is not intended to limit the invention as defined by the appended claims and their equivalents.

This application claims priority of Japanese Patent Application No. 2006-347333 filed Dec. 25, 2006, which is incorporated herein by reference.

What is claimed is:

1. A non-aqueous electrolyte secondary battery comprising: a positive electrode; a negative electrode; and a non-aqueous electrolyte, said positive electrode or said negative electrode being an electrode containing an active material and a conductive agent, said active material being a mixture of a molybdenum dioxide and a lithium titanium oxide in a weight ratio (molybdenum dioxide: lithium titanium oxide) of from 90:10 to 50:50, and said conductive agent containing graphitized vapor grown carbon fiber and massive graphite having an average particle size of 10 μm to 20 μm.

2. The non-aqueous electrolyte secondary battery according to claim 1, wherein the weight ratio of molybdenum dioxide to lithium titanium oxide is from 80:20 to 70:30.

3. The non-aqueous electrolyte secondary battery according to claim 2, wherein the conductive agent contains graphitized vapor grown carbon and massive graphite in amounts such that the weight ratio of graphitized vapor grown carbon to massive graphite is from 30:70 to 60:40.

4. The non-aqueous electrolyte secondary battery according to claim 1, wherein the conductive agent contains graphitized vapor grown carbon and massive graphite in amounts such that the weight ratio of graphitized vapor grown carbon to massive graphite is from 30:70 to 60:40.

* * * * *